M. D. MARTIN.
WASHING-MACHINE.

No. 181,697. Patented Aug. 29, 1876.

WITNESSES:
E. Wolff
John Goethals

INVENTOR:
M. D. Martin
BY
Munn
ATTORNEYS.

UNITED STATES PATENT OFFICE.

MICAJAH D. MARTIN, OF MARIETTA, IOWA.

IMPROVEMENT IN WASHING-MACHINES.

Specification forming part of Letters Patent No. 181,697, dated August 29, 1876; application filed June 16, 1876.

*To all whom it may concern:*

Be it known that I, MICAJAH D. MARTIN, of Marietta, in the county of Marshall and State of Iowa, have invented a new and Improved Washing-Machine, of which the following is a specification:

My invention consists of a novel lever contrivance to a rocking rubber pivoted in the axis of a tub, the lever being to enable the operator to work the rubber by an easy purchase, and, at the same time, to stand sufficiently distant from the tub to avoid the steam rising up from the soap-suds.

Figure 1:
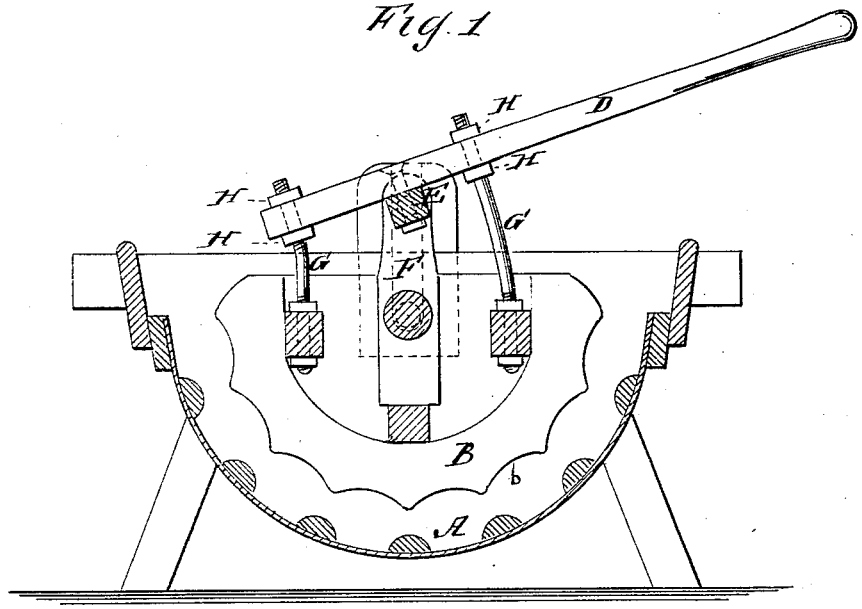
Figure 2:
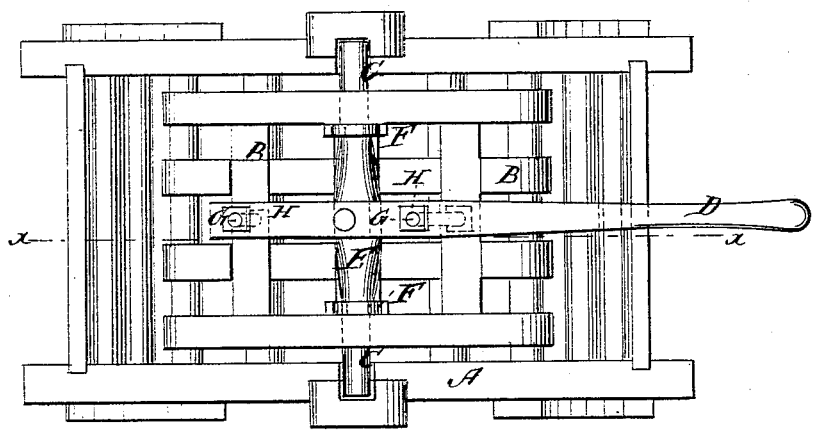

Figure 1 is a sectional elevation of my improved washing-machine, taken on the line $x$ $x$, Fig. 2; and Fig. 2 is a plan view.

Similar letters of reference indicate corresponding parts.

A is the half-round tub, in which is a rubber, B, scalloped on its edges at $b$, and which rocks on the axle C to rub the clothes, to which rubber I propose to attach the handle D, for enabling the operator to stand so far from the tub as to be protected from the steam, and to work the rocker easier than by the common way of taking direct hold of it. For connecting the lever I bolt it to the cross-bar E, which is mounted in the uprights F, so that it can turn, and connect it, each side of the cross-bar, to the rubber by a bolt, G, contrived with nuts H, to adjust the inclination of the lever relatively to the rubber, to adapt the lever to persons of different heights.

Having thus described my invention, I claim as new and desire to secure by Letters Patent—

The lever D, turning cross-bar E, uprights F, bolts G, and adjusting-nuts H, combined with the rubber B, substantially as specified.

MICAJAH D. MARTIN.

Witnesses:
FRANCIS M. MITCHELL.
GEORGE BAILY.